3,041,191
LARGE DIAMETER HIGH REFRACTIVE
INDEX GLASS BEADS
Vincent L. Duval d'Adrian, Shrewsbury, Mo., assignor to Flex-O-Lite Manufacturing Corporation, St. Louis, Mo., a corporation of Missouri
No Drawing. Filed Mar. 15, 1961, Ser. No. 95,815
10 Claims. (Cl. 106—47)

This invention relates to improvements in glass beads and in particular is concerned with glass beads of special composition capable of being made of relatively large diameter and of high refractive index. The instant application is a continuation-in-part of my co-pending application, Serial No. 656,772, filed May 3, 1957, now Patent No. 2,980,547, for High Refractive Index Glass Beads.

The glass beads of this invention find particular utility as reflective beads used in highway marking paints, signs, and the like, which are adapted to be illuminated at night, and for illuminating other surfaces through reflective brilliance of a light directed upon the surface. A particular feature of this invention is the provision of a glass bead composition that makes possible the manufacture of glass beads of increased diameter over those previously made.

The glass beads of this invention have a refractive index of about 1.82 up to 2.0, and lie preferably in the range of about 1.90 to about 1.95 for the desirable reflective brilliance properties. Essentially, the glass bead composition of this invention for the manufacture of increased diameter glass beads uses about 49–65% by weight of barium oxide, about 20–40% by weight of titanium dioxide, 6–14% by weight of boron oxide, and about 1–11% by weight of alumina. This glass is made from charges consisting essentially of about 50–65% barium carbonate, 15–33% titanium dioxide, 9–20% boric acid, up to about 2.5 barium peroxide, and about 0.8—9% alumina.

The alumina component is an added component in addition to the first three mentioned componets which have been disclosed in my prior co-pending application. The alumina is used essentially as a high refractive index component which helps prevent devitrification and makes possible the manufacture of larger beads to provide a crystal clear or so-called water white glass bead composition. Such larger beads of previous compositions, in the general range of as high as one-eighth inch in diameter, are normally slower cooling when used in conventional manufacturing processes and greater devitrification normally occurs.

The conventional high index glass beads used in the industry today are slightly colored and therefore do not have daytime compatibility, since the color of the bead undesirably changes or masks the color of the surface on which the beads are secured, thereby giving an off-color effect. As a further consequence of the glass bead composition of this invention, there has been provided a bead which is resistant to sulphur fumes and industrial gases containing sulphur such as hydrogen sulfide, sulfur dioxide, and the like, which are injurious to glass beads which have been previously employed in this field.

Reflective glass beads having a high degree of brilliance have been described in the Gebhard et al. Patent No. 2,326,634 for use upon roadside signs for night illumination and upon highway marking paints to provide a brightly illuminated surface when the headlight of an automobile shines upon it. However, contrary to the teachings in the Gebhard et al. patent, and as a result of this invention, it has been found that optimum brilliance for reflective glass beads is provided at the refractive index range of about 1.91 to about 1.93. The optimum brilliance is taken in conjunction with optimum visibility to the observer whose eye is not too far removed from the axis of the directed light, such as in the case of an automobile driver who views a reflective highway marking paint. These beads therefore provide a good range of reflection to the viewer.

Further, the glass beads of this invention find particular utility in applications upon highway paint or outdoor signs for illumination since they withstand attack of sulfur containing fumes. Lead oxide containing beads are subject to conversion to lead sulfide and a formation of an opaque coating when contacted with such sulfur containing industrial gases which are quite often encountered in industrial regions. This undesirable attribute of the lead oxide beads has been obviated by the instant invention through the provision of a large diameter high refractive index bead which is not subject to attack by sulphur containing gases.

To provide the glass bead composition using the barium oxide, titanium dioxide, boron oxide, and alumina components, conventional chemical components may be employed. Thus, barium carbonate, titanium dioxide, boric acid, and alumina may be used as a source for the raw materials. Barium peroxide may also be employed for its capacity as an oxidizing agent and to insure a water white color and as a source of barium oxide to provide a high refractive index component. The above components are readily available in the industry and are easily produced in the usual glass making and bead producing techniques to provide the improved large diameter glass beads of this invention.

Accordingly, it is a primary object of this invention to provide a crystal glass bead having a relatively large diameter up to about one-eighth inch in size and having reflective characteristics of great brilliance.

It is a further object of this invention to provide a transparent glass bead having a refractive index of about 1.82 to about 1.95 and upwards and consisting essentially of barium oxide, titanium dioxide, boron oxide, and alumina.

Still another object of this invention is to provide a glass bead composition of relatively high diameter up to about one-eighth inch which has a high refractive index of at least about 1.82.

Still another object of this invention is to provide an improved glass bead composition and high refractive index consisting essentially of about 49–65% by weight of barium oxide, about 20—40% by weight of titanium dioxide, about 6–14% by weight of boron oxide, and about 1–11% by weight of alumina.

Further objects of this invention will appear in the detailed description which follows and will be further apparent to those skilled in the art.

In the production of the high refractive index glass beads of this invention, it has been an objective to use components having a high refractive index which will produce a glass bead of clear transparent characteristics. In the manufacture of such glass beads, there have been used in the novel glass composition, barium carbonate, boric acid, barium peroxide, titanium dioxide, and alumina. In some cases the barium peroxide may be eliminated.

The barium carbonate yields barium oxide in the glass bead composition and is desirably employed as a high melting point flux. Additionally, the barium oxide has a desirably high refractive index of 1.98, which makes it of value in the composition.

The boric acid is desirably employed as a low melting point flux. The boron oxide has a refractive index of 1.464 so that its effect upon the refractive index of the glass bead composition must be compensated for by higher refractive index components.

The titanium dioxide is preferably employed in the rutile form. This form of titanium dioxide has a very high refractive index of 2.7, although it may range from 2.61 to 2.9 in some cases. Thus, the titanium dioxide is desirably employed as a high refractive index component.

The barium peroxide is employed as a desirable oxidizing agent. The resultant barium oxide in the glass bead composition has the same effect as the barium carbonate, and the refractive index of 1.98, as mentioned above, is desirable, and, further, the barium oxide finally employed as a component in the glass serves as the RO component which is a necessary ingredient in glass compositions.

The barium peroxide may also desirably be used in the formulation to insure crystal clarity and water whiteness in coloration. In effect, it is used as a safety factor if off color is to be avoided. As an example in preparing the melt, or in other processes of the formulation of the glass beads, to avoid the danger of using a reducing flame which might present an off color, the barium peroxide is desirably employed to offset this factor and other factors effecting the coloration. In some instances the barium peroxide may be eliminated by the use of the alumina component of the glass composition, which is advantageous due to the much higher cost of barium peroxide.

The alumina may be used in the glass bead composition to replace all or part of the barium peroxide. The alumina maintains a high index of the glass bead composition and aids in the prevention of devitrification. Additionally, and very importantly, the alumina makes possible the manufacture of larger beads which are clear and transparent and water white. It will be understood, however, that small beads, such as those passing through a 400 mesh screen, may also be manufactured where desired. Larger glass beads conventionally are slower in cooling and normally devitrify to a greater degree than smaller beads. However, by the provision of the alumina, quite large glass beads, up to one-eighth inch in diameter, can be manufactured without devitrification. It has also been found that the use of alumina lessens attack on the refractory linings of the tanks in which the glass compositions are prepared and that there is less leaching from the refractory linings. The alumina has a refractive index of 1.765, and this relatively high index does not adversely detract to any great degree the high refractive index of the resultant glass composition, since it is not too far away from the desired range of 1.82 and upward.

The glass bead compositions of this invention are prepared in fashions known in the art and are of comparatively small particle size and of high reflective power. However, the glass bead compositions, although still of comparatively small particle size, are of increased diameter to those conventionally used for reflecting ability in highway marking paints or on beaded signs. The higher diameter beads of this invention, up to about one-eighth inch in size, have utility in various applications. One such application is the employment in pavement marking paints where the larger size prevents them from so-called drowning out when wetted by rain or the like. When so used upon highway pavements or airport runway marking paints, such large diameter beads in the marking paints still provide a high degree of reflectivity during inclement weather, and should drowning out occur or flooding in a certain area it will be readily understood that through drainage reflectivity will return faster with the larger diameter beads than with the smaller size beads.

The reflective power of the glass beads of this invention, which gives a brilliant aspect to the surface illuminated in the dark, must be coupled with a fair degree of visibility to an observer located slightly off the axis of the directed light as is the case for an automobile driver. Without some reflective angularity, beads which otherwise give very good reflective brilliance, are not visibly reflective when viewed slightly away from the same line as the path of directed light beam from the illuminating source to the beads. Thus, when the observer moves outside the ray of light being presented to the illuminated surface, no substantial amount of lighted surface can be seen. It has been found in this invention that glass beads prepared according to the formulations listed below, and having a refractive index in the range of about 1.82 up to about 2.0, give a very high degree of brilliance coupled with good visibility under the normal conditions encountered by an automobile driver whose own headlights light up a highway marking painted strip. Glass beads of somewhat higher refractive index give a very high degree of brilliance, but relatively poor angular visibility, such that they are not practicably suitable in highway marking paints or on the surfaces of road signs.

The manufacture of the glass is accomplished by melting the glass charge or batch in a conventional glass furnace having a generally closed top with openings for escape of gases. The furnace is made of conventional heat resistant refractory that is iron free to prevent discoloration of the ultimate glass. In the production of the melt the heated furnace has added to it in incremental batches the composition of this invention and each batch is melted before an additional batch is employed. The temperature employed is in the range of about 2100–2500° F., which is within the range of temperatures conventionally employed in glass manufacture. After sufficient batches have been added to bring the glass melt up to a desired level, which may take a period of 12 hours, the melt is ready for use. It is to be noted that in the production of the melt the glass is quite fluid and non-viscous, and, as a matter of fact, ripples may be seen due to normal vibration and turbulence when additional batches are added to the liquid. The additional batches float on the top of the liquid melt until they are melted. The process can be carried out in continuous fashion by dispensing the molten glass through an outlet communicating with the body of the glass melt underneath the liquid level.

After the melt has been prepared it is ready for production by conventional methods into glass beads. It is to be noted that in the production of the melt no difficulty is encountered in fining since any gases liberated in the melting of the charge are very rapidly discharged. This takes place in a very short time, in the order of 5 to 10 minutes, as compared to fining time of up to 2 hours for more viscous glasses of different formulations.

After the glass melt has been prepared, the manufacture can be accomplished by conventional methods such as disclosed in the Stradley Patent No. 2,790,723 and Rindone Patent No. 2,838,408. It is desirable that the molten glass be quenched rapidly because of the considerable proportion of titanium dioxide, which has a tendency to cause devitrification. Thus, the molten glass can, according to the conventional practice, as disclosed in the aforementioned patents, be poured directly into water where it is rapidly cooled to form frit or cullet. This frit is then dried and ground to the desired size. The particles can then be converted to glass beads in conventional fashion by blowing or dropping the glass particles through a high temperature flame or radiant heating zone. One such method is shown in the Charles C. Bland United States Patent No. 2,600,963, granted June 17, 1952, assigned to applicant's assignee. They may also be prepared as disclosed in Bleecker Patent No. 1,175,224, or Potters Patent No. 2,334,578. The aforementioned particles can be spherulized to glass beads in the furnace at temperatures of 2100° F., and up, which is within the range of melting temperature of the glass composition of this invention. In the aforementioned process the glass beads are spherulized when passed through the high temperature flame by the action of the surface tension and the discharge of the beads to air provides rapid cooling when particles are removed from the high temperature region to harden the spheres without devitrification.

For the production of large diameter glass beads, up to one-eighth inch in size, it has been found desirable to use the process and apparatus set forth in the Bland Patent No. 2,965,921, granted December 27, 1960. In such process, the glass charge is melted, as previously described, and discharged through the furnace spout as set forth in the patent onto a plate from which it is dispersed by a high pressure fluid stream. Where the fritting method is used, the frit ground up into cullet of the desired large particle size, where the larger beads are desired to be employed, may be dropped through a flame employed in a horizontal-type of furnace or other high temperature flame or radiant heating zone. For the large diameter beads, the aforementioned types of processes are desirably employed rather than a vertical furnace where the beads are blown upwardly, as in the Bland Patent No. 2,600,963, which takes smaller size beads, but does not have sufficient force or enough height in some instances to lift the larger particles through the furnace in their vertical travel through the bottom of the furnace where they are introduced to the top of the furnace where they are discharged.

There are shown below a variety of examples illustrating the range of the components that can be employed in the glass bead compositions of this invention. All of these compositions may be made using the processes previously described.

*Example 1*

In this example a glass bead was made having a refractive index of about 1.92 to 1.93. The charge and the percent of components are as follows:

| Charge | Lb. | Percent | Glass Composition, Weight Percent | |
|---|---|---|---|---|
| BaCO₃ | 150 | 52.1 | BaO | 52.5 |
| TiO₂ | 78 | 27.1 | TiO₂ | 33.2 |
| H₃BO₃ | 45 | 15.7 | B₂O₃ | 10.6 |
| BaO₂ | 6 | 2.1 | | |
| Al₂O₃ | 8.75 | 3.0 | Al₂O₃ | 3.7 |
| | 287.75 | 100.0 | | 100.0 |

The above formulation provided a crystal clear water white glass bead. By increasing the titanium dioxide in the charge to 85 pounds, a glass bead composition of 1.94 refractive index was provided.

In Example 1 above, it was noted that barium peroxide was employed. It has been found that this may be eliminated using only the charge components of barium carbonate, titanium dioxide, boric acid, and alumina. In the succeeding examples, the barium peroxide is eliminated and desirable glass bead compositions are produced with an illustrated range of the proportions of the components employed.

*Example 2*

| Charge | Lb. | Percent | Glass Composition, Weight Percent | |
|---|---|---|---|---|
| BaCO₃ | 150 | 53.4 | BaO | 51.3 |
| TiO₂ | 78 | 27.8 | TiO₂ | 34.3 |
| H₃BO₃ | 45 | 16.0 | B₂O₃ | 10.9 |
| Al₂O₃ | 8 | 2.8 | Al₂O₃ | 3.5 |
| | 281 | 100.0 | | 100.0 |

In this example the glass bead had a refractive index of about 1.92 to 1.93. The glass bead composition was crystal clear and water white and has been found to be particularly desirable for commercial production. In such production the beads can be made up to about one-eighth inch in diameter, and conventionally 10 to 14 mesh size. In this formulation, as in the other formulation, the barium carbonate yields barium oxide and is a glass former and provides high refractive index. The titanium dioxide is used for the same purpose, but provides an even higher refractive index. The boric acid is employed as a flux. The alumina is also a glass former and acts as a catalyst. Although it does not appear to act as a flux, it keeps crystallization and devitrification low. In addition, it raises the melting point of the glass melt to some extent. This aids in the production of large diameter glass beads, as the melt should be somewhat viscous.

*Example 3*

This example illustrates the preparation of glass bead compositions using a minimum of alumina in the amount of 1% in the final glass bead composition. The example also illustrates the employment of a maximum amount of titanium dioxide in the amount of 40% in the glass bead composition.

| Charge | Lb. | Percent | Glass Composition, Weight Percent | |
|---|---|---|---|---|
| BaCO₃ | 25.6 | 52.9 | BaO | 50.0 |
| TiO₂ | 16 | 33.1 | TiO₂ | 40.0 |
| H₃BO₃ | 6.4 | 13.2 | B₂O₃ | 9.0 |
| Al₂O₃ | 0.4 | 0.8 | Al₂O₃ | 1.0 |
| | 48.4 | 100.0 | | 100.0 |

The glass beads produced from this composition had a high refractive index of 1.99 reflected by the high percentage of titanium dioxide. Because of the high percentage of titanium dioxide, this type of glass bead has a heavy devitrification tendency, and very fast cooling is required. In the process of making this bead, the glass melt, which has a melting point of 2500° F., requires a cold water quench and relatively slow pouring into water. The fritted particles obtained in the cold water quench can then be ground to size as previously described and passed through a high temperature heating zone to spherulize into glass bead particles.

*Example 4*

In this example there is shown a glass bead composition employing a high percentage of alumina in the amount of 10.6% in the final glass bead composition. This particular composition also shows a low percentage of boron oxide in the final composition in the amount of 5.9% by weight.

| Charge | Lb. | Percent | Glass Composition, Weight Percent | |
|---|---|---|---|---|
| BaCO₃ | 150 | 53.6 | BaO | 49.4 |
| TiO₂ | 80 | 28.6 | TiO₂ | 34.1 |
| H₃BO₃ | 25 | 8.9 | B₂O₃ | 5.9 |
| Al₂O₃ | 25 | 8.9 | Al₂O₃ | 10.6 |
| | 280 | 100.0 | | 100.0 |

The glass composition of this example had a melting point of 2400° F., and the resultant glass beads made from the glass melt had a refractive index of 1.90 and slightly above. This particular composition also showed advantageous qualities of being formed by casting.

*Example 5*

This example illustrates a glass composition employing a maximum of 15% boron oxide by weight and a minimum of barium oxide in the amount of 49% by weight.

| Charge | Gr. | Percent | Glass Composition, Weight Percent | |
|---|---|---|---|---|
| BaCO₃ | 25.6 | 50.6 | BaO | 49 |
| TiO₂ | 14 | 27.5 | TiO₂ | 35 |
| H₃BO₃ | 10.7 | 21.1 | B₂O₃ | 15 |
| Al₂O₃ | 0.4 | 0.8 | Al₂O₃ | 1 |
| | 50.7 | 100.0 | | 100 |

This glass had a melting point of 2300° F., and produced glass beads having a refractive index of 1.92 to 1.93. The beads were acceptable for some commercial usages, but, however, showed a slightly purplish and brownish coloration.

Example 6

In this example a glass bead composition is shown utilizing a low amount of titanium dioxide in the amount of 30% by weight and a high amount of barium oxide in the amount of 60% by weight.

| Charge | Gr. | Percent | Glass Composition, Weight Percent | |
|---|---|---|---|---|
| $BaCO_3$ | 77 | 61.9 | BaO | 60 |
| $TiO_2$ | 30 | 24.1 | $TiO_2$ | 30 |
| $H_3BO_3$ | 16.4 | 13.2 | $B_2O_3$ | 9 |
| $Al_2O_3$ | 1.0 | .8 | $Al_2O_3$ | 1 |
| | 124.4 | 100.0 | | 100 |

The glass bead composition above, besides using a low amount of titanium dioxide and a high amount of barium oxide also employed the low amount of 1% of alumina. The melting point of the glass charge was 2300° F., and a glass bead having a refractive index of 1.89 to 1.90 was prepared. This composition produced a water white bead that was acceptable for usage.

Example 7

This example is provided to show a glass formulation providing a glass bead of desirable water whiteness, which is easy to manufacture.

| Charge | Gr. | Percent | Glass Composition, Weight Percent | |
|---|---|---|---|---|
| $BaCO_3$ | 14.4 | 58.8 | BaO | 56 |
| $TiO_2$ | 6.8 | 27.8 | $TiO_2$ | 34 |
| $H_3BO_3$ | 2.9 | 11.8 | $B_2O_3$ | 8 |
| $Al_2O_3$ | 0.4 | 1.6 | $Al_2O_3$ | 2 |
| | 24.5 | 100.0 | | 100 |

The glass beads produced from this formulation had a desirable refractive index of slightly above 1.92. The glass formulation had a melting point of 2400° F., and was found easy to handle and manufacture into the glass beads of the invention.

Example 8

In this example a glass formulation is shown utilizing a high amount of barium oxide in the amount of 65%, a low amount of titanium dioxide of 20%, as well as a low amount of alumina of 1%. A high amount of boron oxide of 14% is provided.

| Charge | Gr. | Percent | Glass Composition, Weight Percent | |
|---|---|---|---|---|
| $BaCO_3$ | 83 | 64.0 | BaO | 65 |
| $TiO_2$ | 20 | 15.5 | $TiO_2$ | 20 |
| $H_3BO_3$ | 25.4 | 19.7 | $B_2O_3$ | 14 |
| $Al_2O_3$ | 1 | .8 | $Al_2O_3$ | 1 |
| | 129.4 | 100.0 | | 100 |

This glass had a melting point of 2350° F., and a refractive index of 1.82+.

Through the formulations of this invention, glass beads may be produced from small size up to 40 mesh and 18 mesh and as high as 10–12 mesh and even up to one-eighth inch in diameter. The glass beads disclosed in my aforementioned parent application can also be made through a wide range in size, but have an upper limit of about 20 mesh as the largest size at which point devitrification begins to be a problem. For general reference the 10 mesh size provides an opening of width ranging from 0.046 to 0.085 inch, corresponding to 1,170 microns to 2,160 microns. The 20 mesh size provides an opening of 0.02 to 0.041 inch, corresponding to 559 to 1,041 microns. Accordingly, through the formulations provided, increased beads may be made of high refractive index and crystal clarity and water whiteness in color that are completely acceptable for commercial applications where larger beads are desired.

Various changes and modifications in the formulations and within the ranges and proportions generally described will be apparent to those skilled in the art. Such changes and modifications are within the scope and teaching of this invention as defined by the claims appended hereto.

What is claimed is:

1. A glass bead composition consisting essentially of about 49% to 65% barium oxide, 20% to 40% titanium dioxide, 6% to 15% boron oxide, and 1% to 11% alumina by weight.

2. A glass bead composition having a refractive index of about 1.82 to 1.99 and consisting assentially of about 49% to 65% barium oxide, 20% to 40% titanium dioxide, 6% to 14% boron oxide, and 1% to 11% alumina by weight.

3. A glass bead composition characterized by its lack of color and transparency and consisting essentially of about 49% to 65% barium oxide, 20% to 40% titanium dioxide, 6% to 14% boron oxide, and 1% to 11% alumina by weight.

4. A glass bead composition characterized by its transparency and lack of color and having a refractive index of about 1.82 to 1.99 and consisting essentially of about 49% to 65% barium oxide, 20% to 40% titanium dioxide, 6% to 14% boron oxide, and 1% to 11% alumina by weight.

5. A glass bead composition consisting essentially of about 51% to 52% barium oxide, 34% titanium dioxide, 11% boron oxide and 3% to 4% alumina by weight.

6. A glass bead composition characterized by its transparency and lack of color and having a refractive index of about 1.85 to 1.95 and consisting essentially of about 51% to 52% barium oxide, 34% titanium dioxide, 11% boron oxide and 3% to 4% alumina by weight.

7. A glass bead prepared from a charge consisting essentially of the weight percentages of about 50% to 65% barium carbonate, 15% to 33% titanium dioxide, 9% to 20% boric acid, up to 2.5% barium peroxide, and 0.8% to 9% alumina.

8. A glass bead prepared from a charge consisting essentially of the weight percentages of about 52% barium carbonate, 27% titanium dioxide, 16% boric acid, 2% barium peroxide and 3% alumina.

9. A glass bead prepared from a charge consisting essentially of the weight percentages of about 50% to 65% barium carbonate, 25% to 33% titanium dioxide, 9% to 16% boric acid and 0.8% to 9% alumina.

10. A glass bead prepared from a charge consisting essentially of the weight precentages of about 53% barium carbonate, 28% titanium dioxide, 16% boric acid and 3% alumina.

References Cited in the file of this patent

UNITED STATES PATENTS

| | | |
|---|---|---|
| 2,870,030 | Stradley et al. | Jan. 20, 1959 |
| 2,877,124 | Welsch | Mar. 10, 1959 |
| 2,980,547 | D'Adrian | Apr. 18, 1961 |